United States Patent
Nahi et al.

(10) Patent No.: US 12,086,544 B2
(45) Date of Patent: Sep. 10, 2024

(54) SENTIMENT ANALYSIS

(71) Applicant: RAKUTEN MOBILE, INC., Tokyo (JP)

(72) Inventors: Petrit Nahi, Tokyo (JP); Madhukiran Medithe, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 268 days.

(21) Appl. No.: 17/645,721

(22) Filed: Dec. 22, 2021

(65) Prior Publication Data

US 2023/0089324 A1   Mar. 23, 2023

Related U.S. Application Data

(60) Provisional application No. 63/245,198, filed on Sep. 17, 2021.

(51) Int. Cl.
*G06F 40/284* (2020.01)
*G06F 40/40* (2020.01)
*G06V 30/19* (2022.01)

(52) U.S. Cl.
CPC .......... *G06F 40/284* (2020.01); *G06F 40/40* (2020.01); *G06V 30/19173* (2022.01)

(58) Field of Classification Search
CPC ........ G06F 40/284; G06F 40/40; G06F 40/30; G06V 30/19173
USPC ................................. 704/10, 222, 232, 251
See application file for complete search history.

(56) References Cited

U.S. PATENT DOCUMENTS

| | | | |
|---|---|---|---|
| 11,521,639 B1 * | 12/2022 | Shon | G06N 3/0895 |
| 2012/0259617 A1 | 10/2012 | Indukuri et al. | |
| 2018/0150739 A1 | 5/2018 | Wu | |
| 2020/0125928 A1 | 4/2020 | Doyle | |
| 2021/0034963 A1 | 2/2021 | Chu et al. | |
| 2021/0233530 A1 | 7/2021 | Thomson et al. | |

FOREIGN PATENT DOCUMENTS

| | | |
|---|---|---|
| CN | 112364170 A | 2/2021 |
| CN | 112784532 A | 5/2021 |
| WO | 2020073673 A1 | 4/2020 |

OTHER PUBLICATIONS

Tang et al., "Learning Sentiment-Specific Word Embedding for Twitter Sentiment Classification", pp. 1555-1565. Association for Computational Linguistics. Online, Jun. 25, 2014; [retrieved Mar. 30, 2022], Retrieved from the Internet: <URL: https://aclanthology.org/P14-1146.pdf>, 11pp.

International Search Report in PCT Application No. PCT/US2022/012475, mailed May 5, 2022, 11pp.

* cited by examiner

*Primary Examiner* — George C Monikang
(74) *Attorney, Agent, or Firm* — HAUPTMAN HAM, LLP

(57) ABSTRACT

Polarity classifications of writing samples are obtained by sentiment analysis operations including embedding each word of a writing sample into a word vector based on surrounding words, extracting one or more features of the writing sample, applying a feature learning function to the one or more features, estimating a polarity of the writing sample based on output from the word learning function and output from the feature learning function, and training the word learning function and the feature learning function based on a loss function relating the estimated polarity to the word vector to produce a model for writing sample polarity classification.

20 Claims, 10 Drawing Sheets

SENTIMENT ANALYSIS

PRIORITY CLAIM AND CROSS-REFERENCE

This application claims priority to Provisional Application No. 63/245,198, filed Sep. 17, 2021, which is hereby incorporated by reference in its entirety.

BACKGROUND

Sentiment analysis is a computational science of finding people's opinions, attitude and emotions expressed in written language. Sentiment analysis can help businesses to determine customer satisfaction, predict customer needs, find competitor insights, etc. Sentiment analysis has a wide range of applications because people's opinions are central to human activity and influence decision making.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
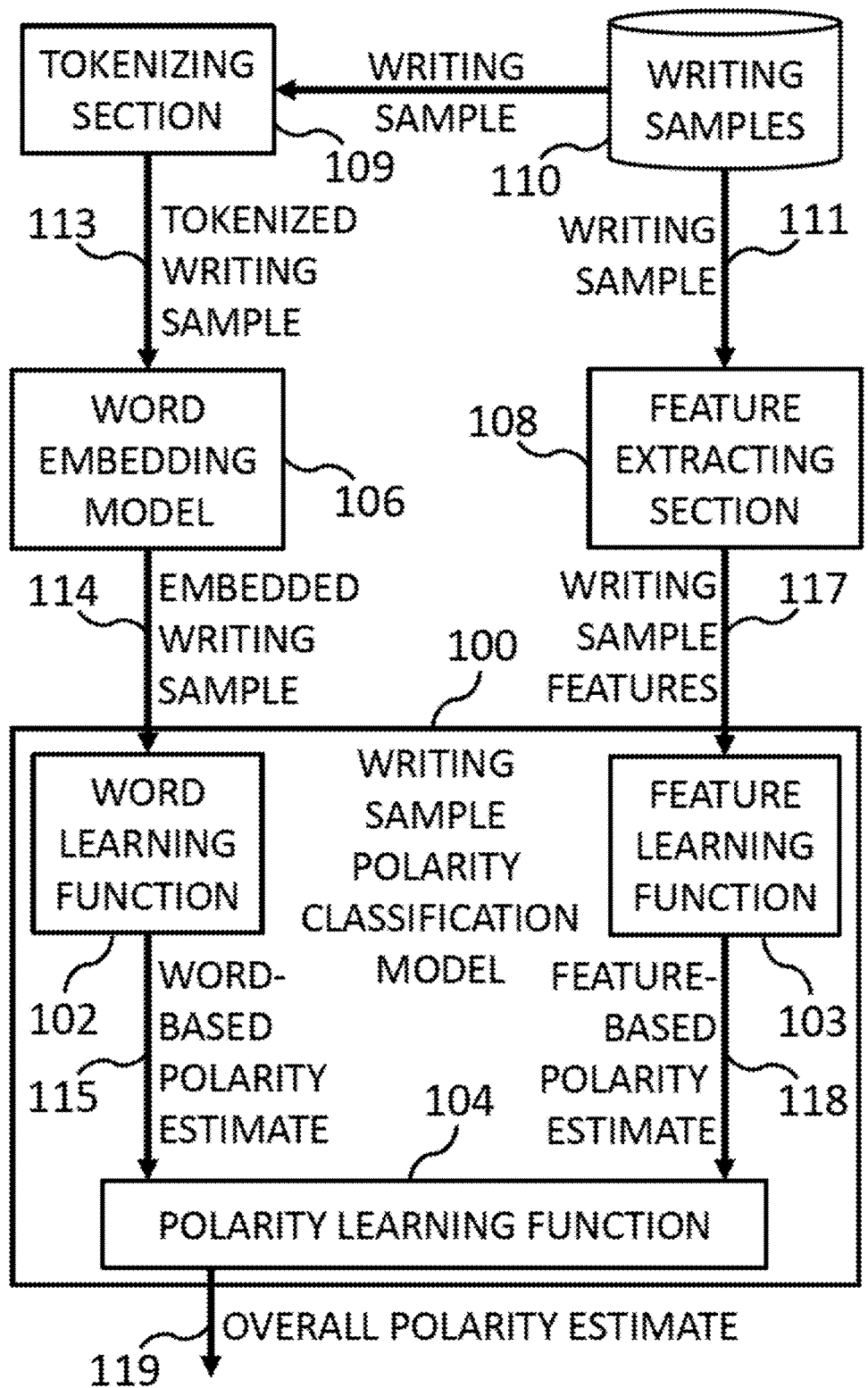
FIG. 1 is a schematic diagram of data flow for sentiment analysis, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Research in the field of sentiment analysis mainly focuses on structured text, such as user reviews, rather than unstructured text, such as messages posted on social media. Sentiment analysis of social media messages still has many issues, which are mainly attributed to the informal nature of tweets. There are many social media platforms where customers voice their opinion about various issues, products, and services. Therefore, messages posted to social media act as sources of data to determine public opinions. There is a challenge in modelling messages posted to social media in that the writing style of many messages is informal and does not follow proper grammatical structure. For example, some messages posted to social media ignore proper grammatical constructs, use abbreviations and slang terms, and use icons or character combinations to express emotions, commonly known as "emoji" and "emoticon", respectively.

At least some embodiments herein present ways to meet such challenges. At least some embodiments herein include development of a word embedding model based on messages posted to social media, as most existing pre-trained word embedding models are based on clean and structured texts. At least some embodiments herein identify extra features for input to sentiment analysis models in addition to word embedding. In at least some embodiments, these features include emoticons and/or emoji, sentence length, number of hashtags, etc. In at least some embodiments, sentiment analysis models include an attention mechanism to focus on words that are more relevant to sentiment analysis. In at least some embodiments, sentiment analysis models are trained for polarity classification as positive, negative, or neutral.

FIG. 1 is a schematic diagram of data flow for sentiment analysis, according to at least one embodiment of the present invention. The diagram includes a writing sample polarity classification model 100, a word embedding model 106, a feature extracting section 108, a tokenizing section 109, and writing samples 110.

Writing samples 110 includes a plurality of writing samples. In at least some embodiments, each writing sample included in writing samples 110 is paired with a polarity label of positive, negative, or neutral for use as training data. In at least some embodiments, writing samples 110 are messages posted to social media. In at least some embodiments, writing samples 110 are retrieved from a social media website. In at least some embodiments, users post messages directly to writing samples 110. In at least some embodiments, writing samples 110 include unstructured text, graphic expressions of emotion, such as emoticons or emoji, and references, such as HTTP addresses, hashtags, etc.

Tokenizing section 109 is configured to tokenize words of a writing sample, such as writing sample 111 from writing samples 110. In at least some embodiments, tokenizing section 109 matches words of the writing sample with words of a word language library to output a tokenized writing sample, such as tokenized writing sample 113. In at least some embodiments, tokenizing section 109 matches different tenses or cases of a term with a unified case of the term, such as matching verbs of any tense to the infinitive, or matching adjectives and adverbs to a noun. In at least some embodiments, tokenizing section 109 replaces each unified term in the writing sample with a unique code. In at least some embodiments, tokenizing section pre-processes words of a writing sample before tokenizing the writing sample.

Word embedding model 106 is configured to embed each word of a tokenized writing sample, such as tokenized writing sample 113, into a word vector based on surrounding words. In at least some embodiments, the word vectors are combined to form embedded writing sample 114. In at least some embodiments, word embedding model 106 is a machine learning function trained separately from the writing sample polarity classification model 100. In at least some embodiments, word embedding model 106 is trained using writing samples 110.

Feature extracting section 108 is configured to extract one or more features of a writing sample, such as writing sample 111. In at least some embodiments, feature extracting section 108 is configured to extract a number of words in the writing sample, a number of references in the writing sample, one or more specific references in the writing sample, a number of graphic representations of positive emotion, a number of graphic representations of negative emotion, one or more specific graphic representations of emotion, etc., and combine the results into an encoded data string, such as writing sample features 117. In at least some embodiments, the features include a number of words, a number of references, a graphical representation of a positive emotion, and a graphical representation of a negative emotion.

Writing sample polarity classification model 100 includes a word learning function 102, a feature learning function 103, and a polarity learning function 104. Word learning function 102 is trained to estimate a polarity based on an embedded writing sample, such as embedded writing sample 114. In at least some embodiments, word learning function 102 includes one or more neural networks arranged in layers that, when applied to the embedded writing sample, output a word-based polarity estimate, such as word-based polarity estimate 115. In at least some embodiments, word learning function 102 includes a Long Short-Term Memory (LSTM) layer. In at least some embodiments, word learning function 102 includes an LSTM layer and an attention layer. In at least some embodiments, the attention layer is trained to emphasize words having a stronger association with a single possible polarity estimation output. In at least some embodiments, word learning function 102 includes an LSTM layer, an attention layer, and one or more dropout layers and dense layers.

Feature learning function 103 is trained to estimate a polarity based on writing sample features, such as writing sample features 117. In at least some embodiments, feature learning function 103 includes one or more neural networks arranged in layers that, when applied to the writing sample features, output a feature-based polarity estimate, such as feature-based polarity estimate 118. In at least some embodiments, feature learning function 103 includes a batch normalization layer and one or more dropout layers and dense layers.

Polarity learning function 104 is trained to estimate a polarity based on a word-based polarity estimate, such as word-based polarity estimate 115, and a feature-based polarity estimate, such as feature-based polarity estimate 118. In at least some embodiments, polarity learning function 104 is configured for input of a concatenated word-based polarity estimate and feature-based polarity estimate. In at least some embodiments, polarity learning function 104 includes one or more neural networks arranged in layers that, when applied to the word-based polarity estimate and the feature-based polarity estimate, output an overall polarity estimate, such as overall polarity estimate 119. In at least some embodiments, polarity learning function 104 is a classification learning function trainable to output an estimation of the polarity of a writing sample in one of two categories: positive and negative. In at least some embodiments, polarity learning function 104 includes a confidence threshold that, if not exceeded, results in an output of neutral instead of positive or negative. In at least some embodiments, a positive classification indicates that the writing sample captures a positive view of a subject of the writing sample, such as a review of a product that the author is pleased with. In at least some embodiments, a negative classification indicates that the writing sample captures a negative view of a subject of the writing sample, such as a review of a product that a user is upset with. In at least some embodiments, polarity learning function 104 includes one or more dense layers.

Figure 2:
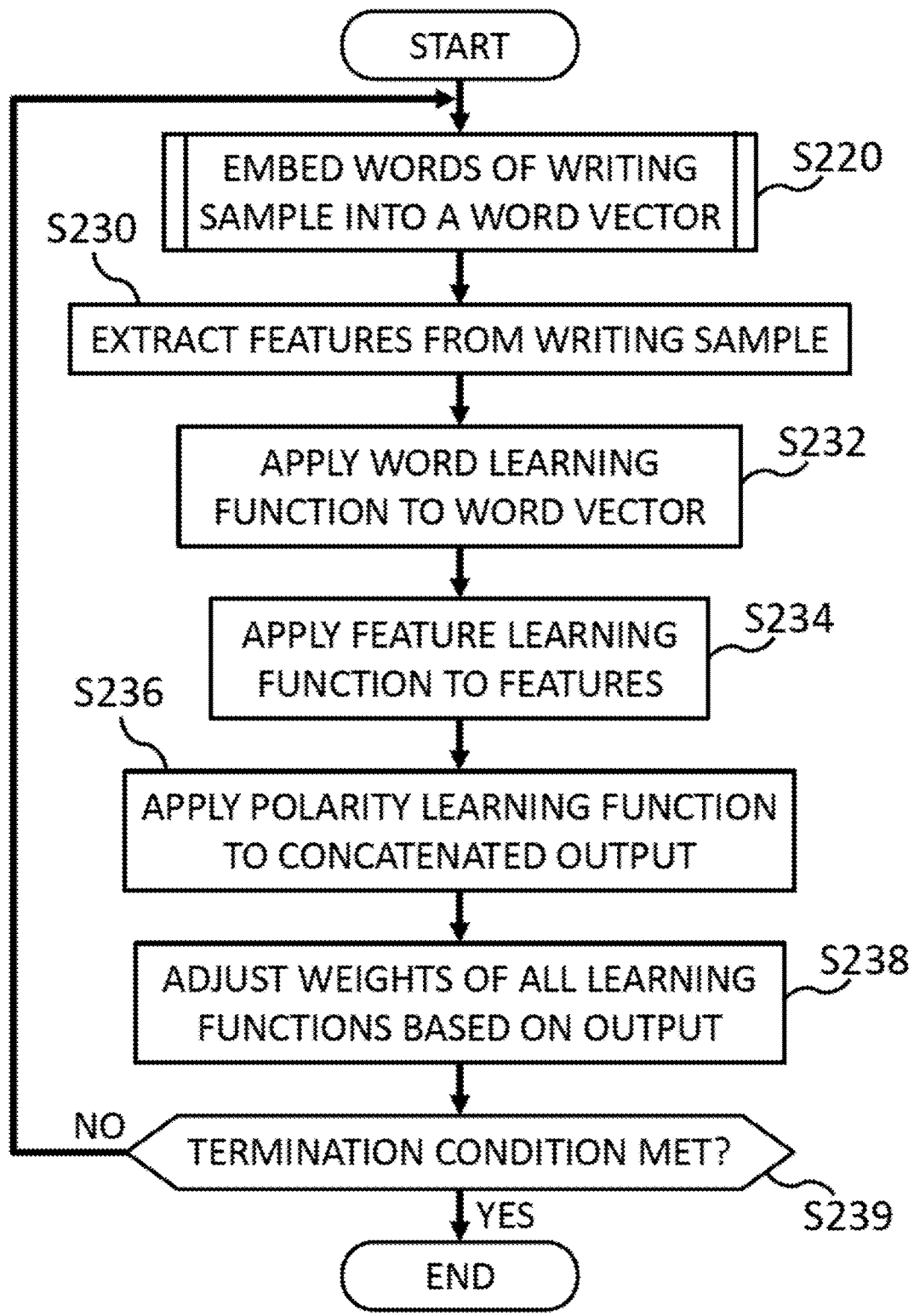
FIG. 2 is an operational flow for training a sentiment analysis model, according to at least one embodiment of the present invention.

FIG. 2 is an operational flow for training a sentiment analysis model, according to at least one embodiment of the present invention. The operational flow provides a method of training a sentiment analysis model. In at least some embodiments, the method is performed by a controller of an apparatus including sections for performing certain operations, such as the controller and apparatus shown in FIG. 10, which will be explained hereinafter.

Figure 3:
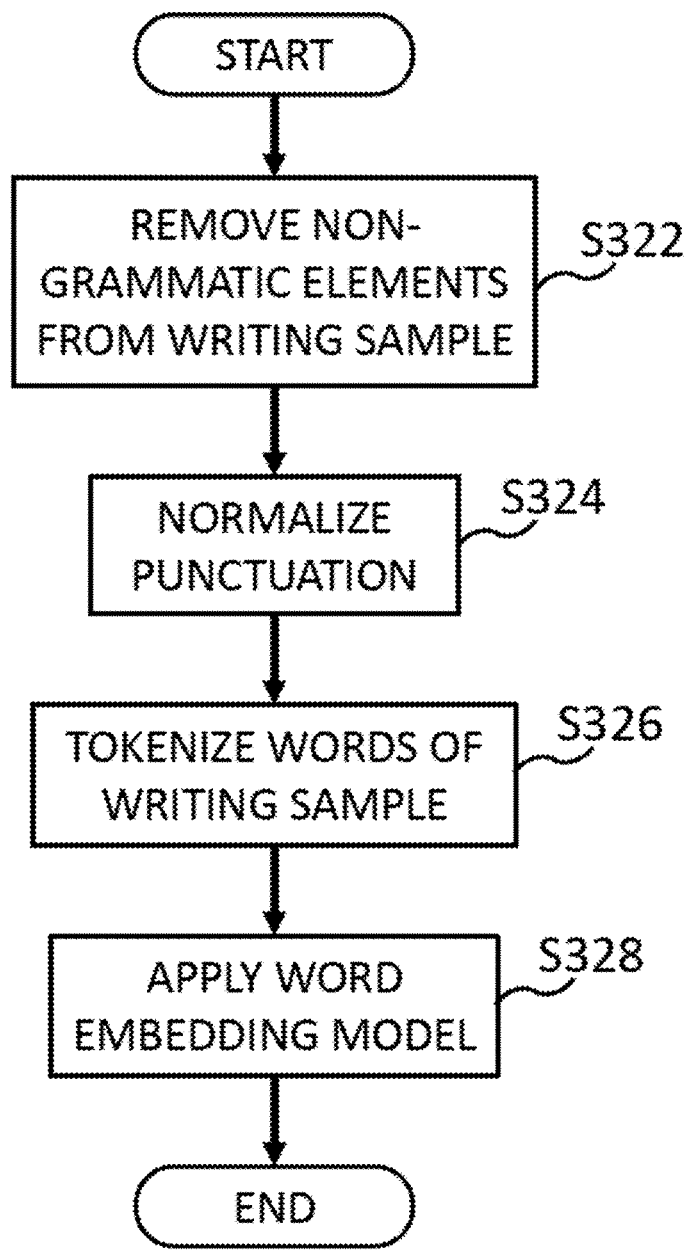
FIG. 3 is an operational flow for embedding words of a writing sample, according to at least one embodiment of the present invention.

At S220, an embedding section or a sub-section thereof embeds words of a writing sample into a word vector. In at least some embodiments, the embedding section embeds each word of a plurality of words of a writing sample into a word vector based on surrounding words. In at least some embodiments, the word embedding proceeds as shown in FIG. 3, which will be explained hereinafter.

Figure 6:
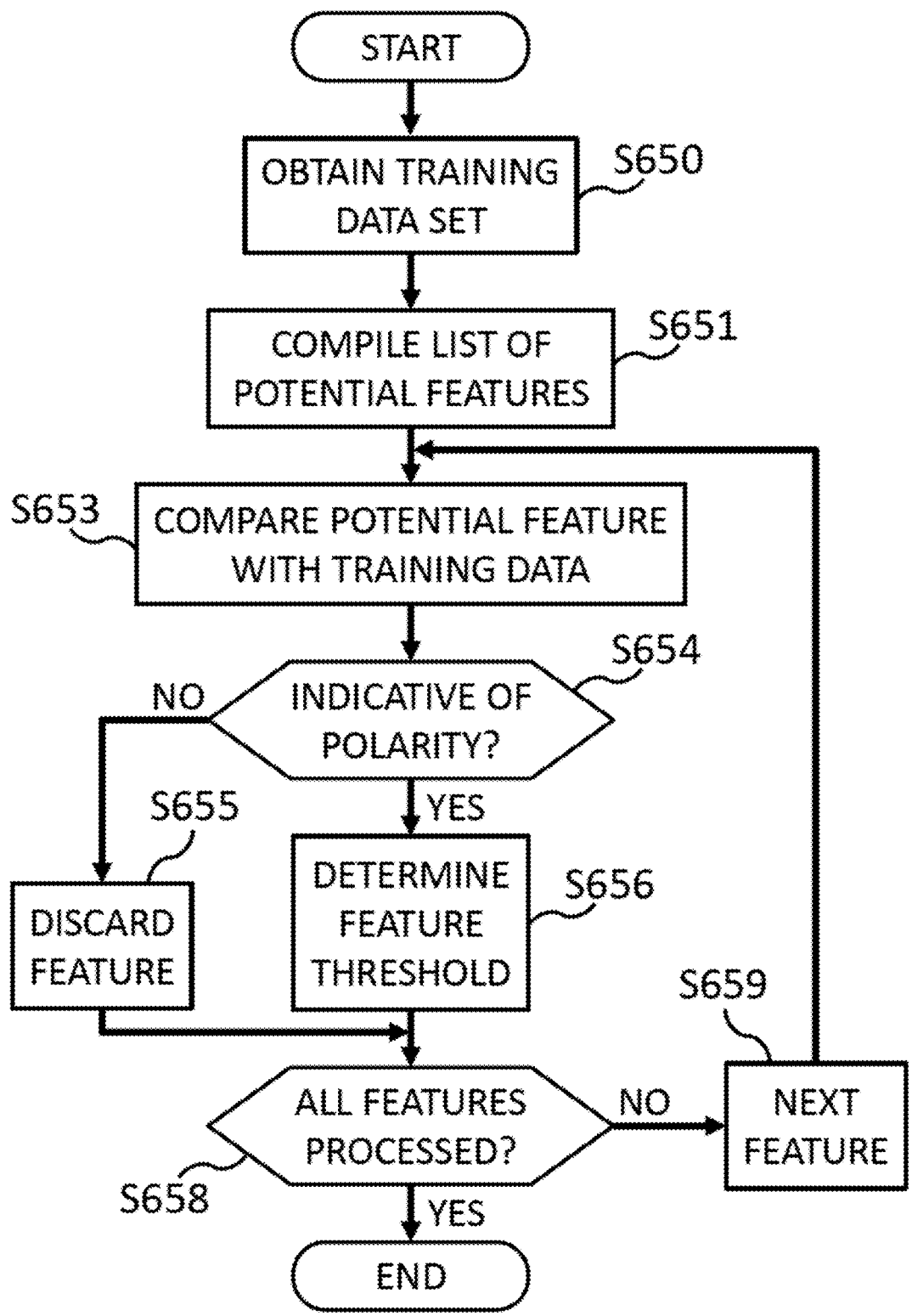
FIG. 6 is an operational flow for determining polarity indicative features, according to at least one embodiment of the present invention.

At S230, an extracting section or a sub-section thereof extracts one or more features of the writing sample. In at least some embodiments, the extracting section identifies pre-determined features of the writing sample, and encodes the results into a data string representing the features of the writing sample. In at least some embodiments, the extracting section identifies one or more of a number of words, a number of references, a graphical representation of positive emotion, and a graphical representation of negative emotion. In at least some embodiments, the extracting section identifies, among the references, a number of hashtags, a number of HTTP addresses, a number of user mentions, and a user to which the writing sample is directed, such as "reply" to a certain user. In at least some embodiments, the extracting section identifies whether or not one or more specific users are mentioned, whether or not the writing sample is directed to one or more specific users, and/or whether or not one or more specific graphic representations of emotion are present. In at least some embodiments, the extracting section encodes the results into a data string by using numerical values to represent features being counted, and a binary value to represent whether or not a feature exists. In at least some embodiments, the order and bit-width of each value in the data string is kept constant as writing samples are processed. In at least some embodiments, the features of the writing sample are pre-determined as shown in FIG. 6, which will be explained hereinafter.

Figure 7:
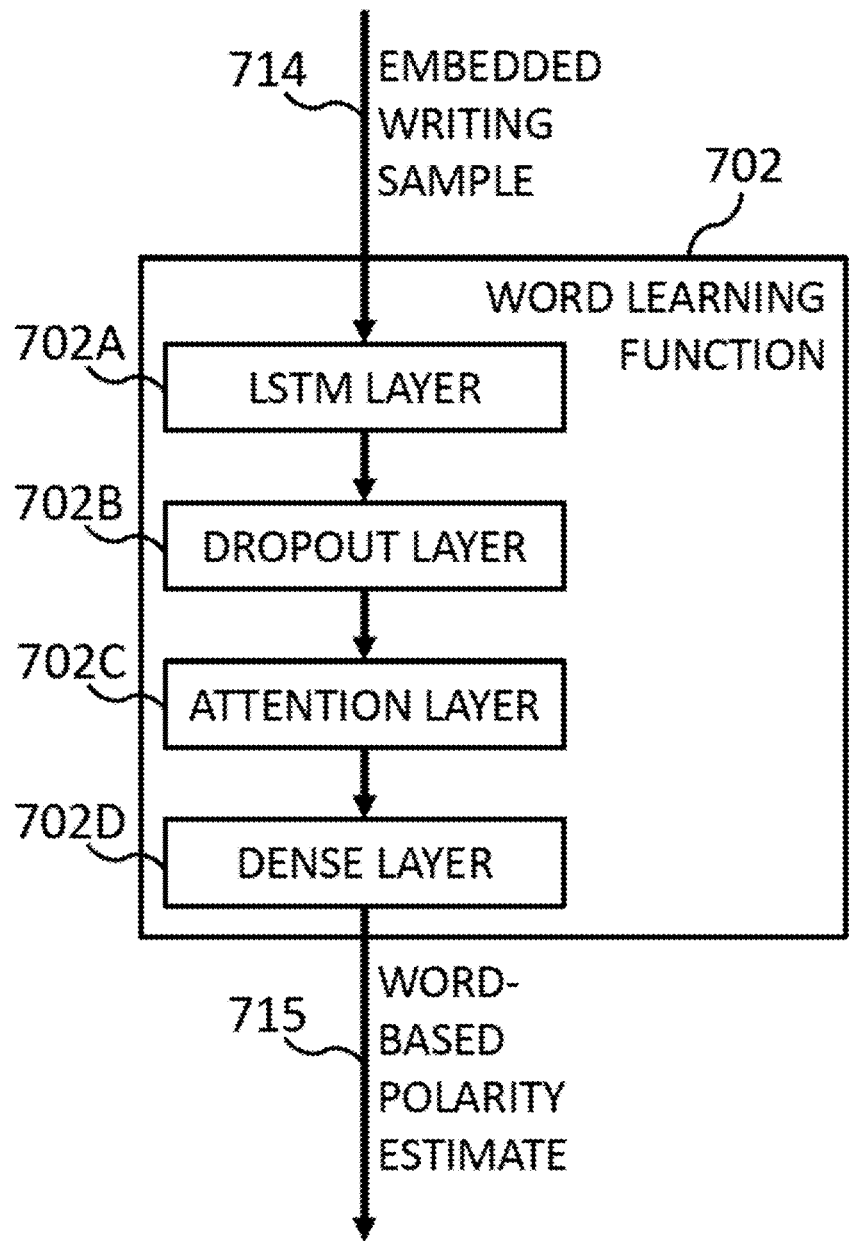
FIG. 7 is a schematic diagram of a word learning function, according to at least one embodiment of the present invention.

At S232, an applying section or a sub-section thereof applies a word learning function to a word vector. In at least some embodiments, the word learning function is a neural network trainable to output an estimation of the polarity of a writing sample. In at least some embodiments, the word learning function is a classification learning function trainable to output an estimation of the polarity of a writing sample in one of three categories: positive, negative, and neutral. In at least some embodiments, the word learning function outputs an estimation of the polarity of a writing sample. In at least some embodiments, the word learning function is an LSTM neural network. In at least some embodiments, the word learning function includes a plurality of layers, each layer corresponding to a different type of neural network. In at least some embodiments, the layers of the word learning function include an LSTM layer and an attention layer. In at least some embodiments, the layers of the word learning function further include one or more dropout layers and dense layers. In at least some embodiments, the word learning function is as shown in FIG. 7, which will be explained hereinafter.

Figure 8:
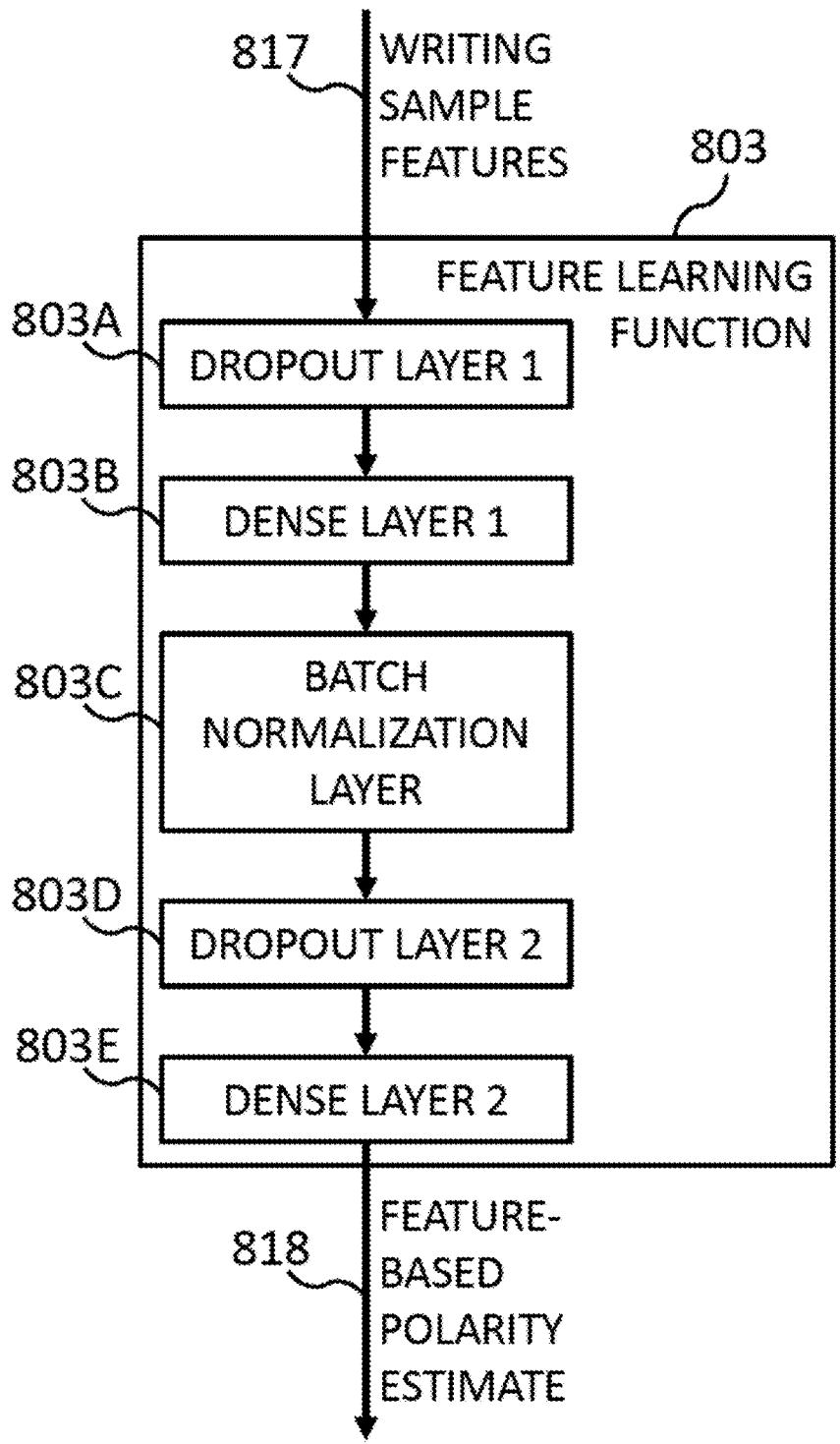
FIG. 8 is a schematic diagram of a feature learning function, according to at least one embodiment of the present invention.

At S234, an applying section or a sub-section thereof applies a feature learning function to the one or more features extracted at S230. In at least some embodiments, the feature learning function is a neural network trainable to output an estimation of the polarity of a writing sample. In at least some embodiments, the feature learning function is a classification learning function trainable to output an estimation of the polarity of a writing sample in one of three categories: positive, negative, and neutral. In at least some embodiments, the feature learning function outputs a feature representation of an estimation of the polarity of a writing sample. In at least some embodiments, the feature learning function includes a plurality of layers, each layer corresponding to a different type of neural network. In at least some embodiments, the layers of the word learning function include a batch normalization layer. In at least some embodiments, the layers of the word learning function further include one or more dropout layers and dense layers. In at least some embodiments, the word learning function is as shown in FIG. 8, which will be explained hereinafter.

Figure 9:
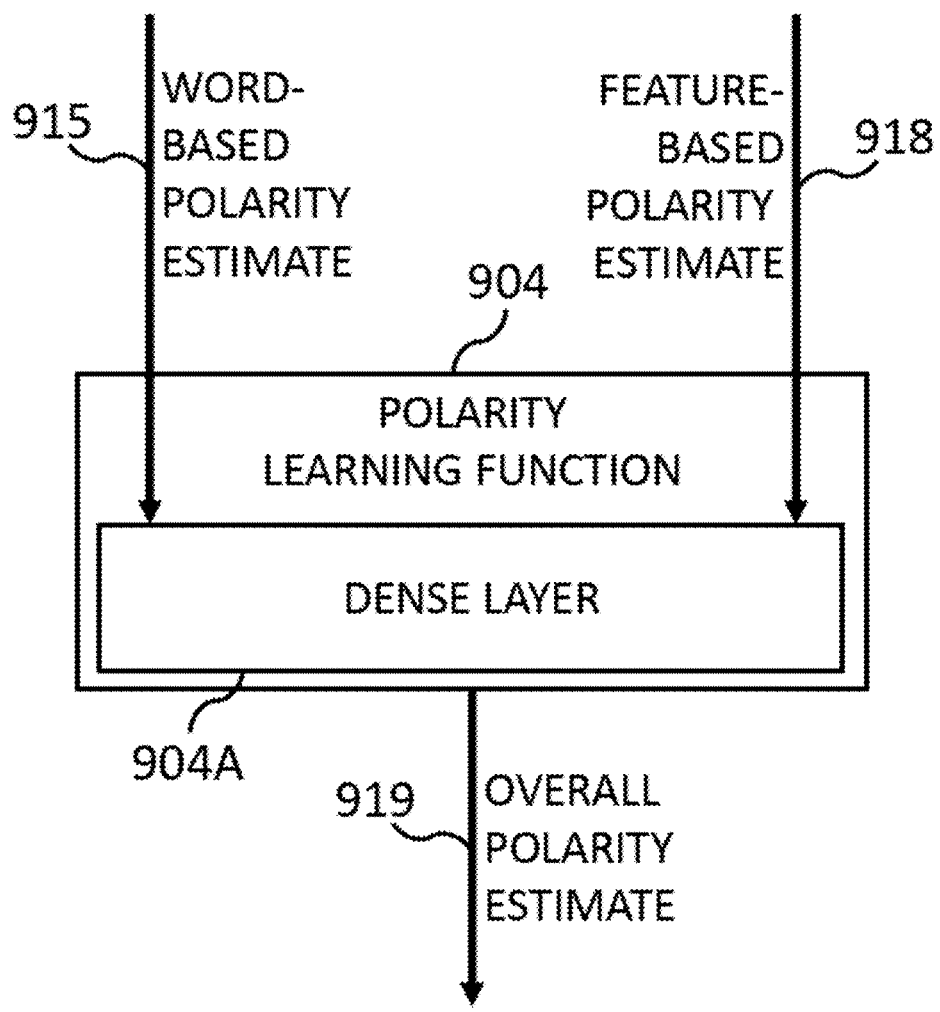
FIG. 9 is a schematic diagram of a polarity learning function, according to at least one embodiment of the present invention.

At S236, an applying section or a sub-section thereof applies a polarity learning function to a combination of output from the word learning function and the feature learning function. In at least some embodiments, the polarity learning function is a neural network trainable to output an estimation of the polarity of a writing sample. In at least some embodiments, the polarity learning function is a classification learning function trainable to output an estimation of the polarity of a writing sample in one of two categories: positive and negative. In at least some embodiments, the polarity learning function includes a confidence threshold that, if not exceeded, results in an output of neutral instead of positive or negative. In at least some embodiments, the word learning function includes one or more dense neural network layers. In at least some embodiments, the word learning function is as shown in FIG. 9, which will be explained hereinafter.

At S238, a training section or a sub-section thereof adjusts the weights of the word learning function, the feature learning function, and the polarity learning function based on the output of the polarity learning function. In at least some embodiments, the training section trains the word learning function, the feature learning function, and the polarity learning function based on a loss function relating the output of the polarity learning function to the word vector to produce a model for writing sample polarity classification. In at least some embodiments, the training section trains the word learning function, the feature learning function, and the polarity learning function together as a model for polarity classification of writing samples. In at least some embodiments, the training section uses a binary cross entropy loss function. In at least some embodiments, the training section uses an optimizer, such as RMSprop. In at least some embodiments, the training section adjust the weights of the word learning function, the feature learning function, and the polarity learning function once a batch of writing samples has been processed at S220-S236. In at least some embodiments, the number of writing samples in one batch is an adjustable hyper-parameter. In at least some embodiments, the training section does not train the word embedding model at the same time as the word learning function, the feature learning function, and the polarity learning function, because the word embedding model is trained before training the word learning function, the feature learning function, and the polarity learning function.

At S239, the controller or a section thereof, determines whether a termination condition for terminating the training process has been met. In at least some embodiments, the termination condition is a number of batches. In at least some embodiments, one batch includes all of the writing samples, and therefore one batch is complete once all of the writing samples have been processed once. In at least some embodiments, the termination condition is measured by convergence of the solution to the loss function. If the controller determines that the termination condition has not been met, then the operational flow returns to word embedding at S220 for another batch. If the controller determines that the termination condition has been met, then the operational flow ends.

FIG. 3 is an operational flow for embedding words of a writing sample, according to at least one embodiment of the present invention. The operational flow provides a method of embedding words of a writing sample. In at least some embodiments, the method is performed by an embedding section of a controller of an apparatus, such as the controller and apparatus shown in FIG. 10, which will be explained hereinafter.

At S322, the embedding section or a sub-section thereof removes non-grammatic elements from the writing sample. In at least some embodiments, the non-grammatic elements include numbers, graphic expressions of emotion, such as emoticons or emoji, and references, such as HTTP addresses, hashtags, etc. In at least some embodiments, the embedding section further removes any abbreviation, acronym, or slang term that cannot be equated to a term in a word language library.

At S324, the embedding section or a sub-section thereof normalizes punctuation of the writing sample. In at least some embodiments, the embedding section normalizes punctuation by removing repeated punctuation marks, such as repeated question and exclamation marks. In at least some embodiments, the embedding section removes punctuation marks that are out of place and inserts missing punctuation marks according to the rules of grammar. In at least some embodiments, the operations at S322 and S324 are collectively referred to as "pre-processing" the writing sample.

At S326, the embedding section or a sub-section thereof tokenizes each word of the writing sample. In at least some embodiments, the embedding section matches words of the writing sample with words of the word language library to output a tokenized writing sample. In at least some embodiments, the embedding section matches different tenses or cases of a term with a unified case of the term, such as matching verbs of any tense to the infinitive, or matching adjectives and adverbs to a noun. In at least some embodiments, the word language library is the same language as the writing sample, such as MECAB for Japanese writing samples. In at least some embodiments, the embedding section replaces each unified term in the writing sample with a unique code. In at least some embodiments, the embedding section removes any words that cannot be equated to a term in the word language library instead of or in addition to any such word removal at S322. In at least some embodiments, the embedding section issues a notification or a prompt for a user to input a resolution for any words that cannot be equated to a term in the word language library. In at least some embodiments, the embedding section removes any terms deemed to be too common, such as "a", "the", "and", etc. In at least some embodiments, the embedding section maintains certain common words that have are identified as having an impact on polarity classification, such as "good", "bad", "yes", "no", etc.

At S328, the embedding section applies the tokenized writing sample to the word embedding model. In at least some embodiments, the embedding section causes an applying section to perform the operation at S328. In at least some embodiments, the embedding section embeds each word of a plurality of words of a writing sample into a word vector based on surrounding words.

Figure 4:
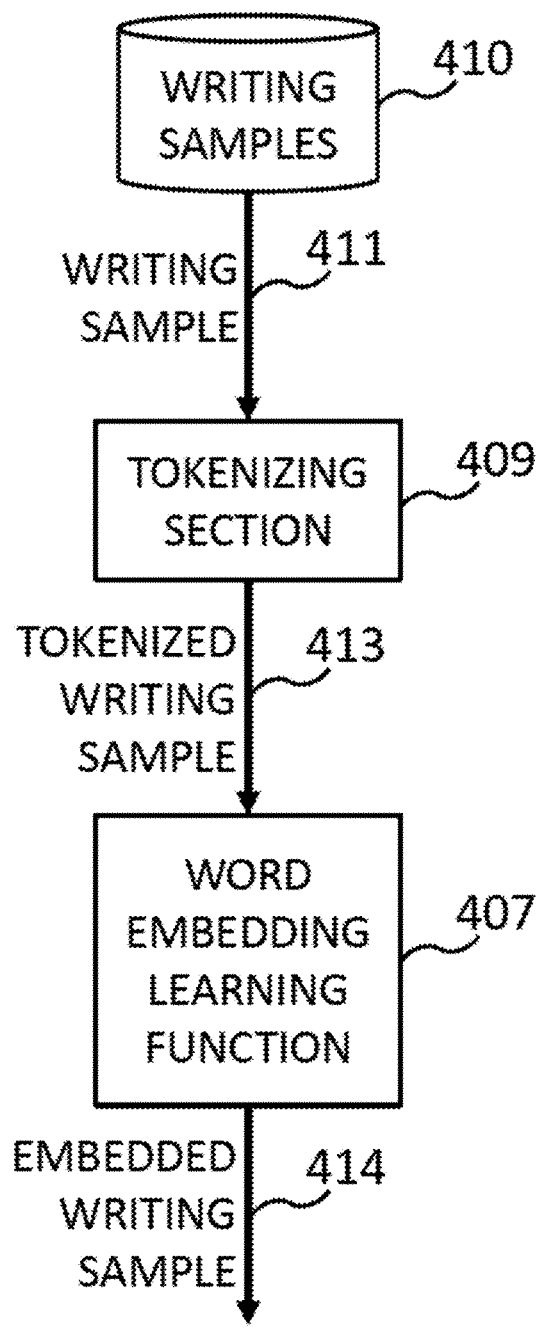
FIG. 4 is a schematic diagram of data flow for word embedding, according to at least one embodiment of the present invention.

FIG. 4 is a schematic diagram of data flow for word embedding, according to at least one embodiment of the present invention. The diagram includes a word embedding learning function 407, a tokenizing section 409, and writing samples 410.

Writing samples 410 includes a plurality of writing samples. In at least some embodiments, unlike writing samples 110 in FIG. 1, writing samples included in writing samples 410 are not paired with a polarity label or any other label, for use as training data to train word embedding learning function 407. In at least some embodiments, writing samples 410 are messages posted to social media. In at least some embodiments, writing samples 410 include unstructured text, graphic expressions of emotion, such as emoticons or emoji, and references, such as HTTP addresses, hashtags, etc.

Tokenizing section 409 is configured to tokenize words of a writing sample, such as writing sample 411 from writing samples 410. In at least some embodiments, tokenizing section 409 matches words of the writing sample with words of a word language library to output a tokenized writing sample, such as tokenized writing sample 413. In at least some embodiments, tokenizing section pre-processes words of a writing sample before tokenizing the writing sample.

Word embedding learning function 407 is trained to embed each word of a tokenized writing sample, such as tokenized writing sample 413, into a word vector based on surrounding words. In at least some embodiments, the word vectors are combined to form embedded writing sample 114. In at least some embodiments, word embedding learning function 407 is a machine learning function trained separately from the writing sample polarity classification model 100. In at least some embodiments, word embedding model 106 is trained using the operational flow of FIG. 5, explained hereinafter.

Figure 5:
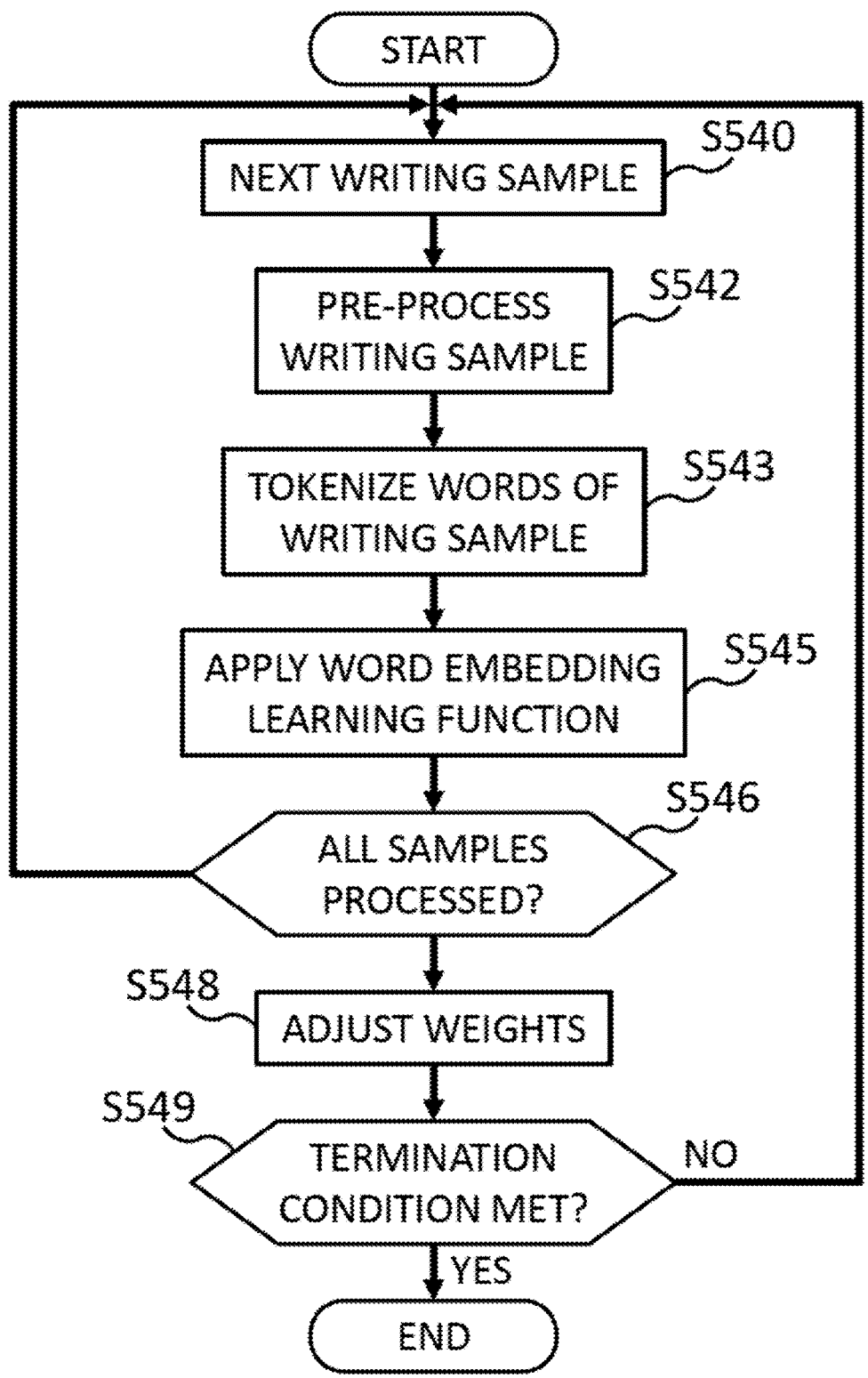
FIG. 5 is an operational flow for training a word embedding model, according to at least one embodiment of the present invention.

FIG. 5 is an operational flow for training a word embedding model, according to at least one embodiment of the present invention. The operational flow provides a method of training a word embedding learning function, such as word embedding learning function 407, to produce a word embedding model, such as word embedding model 106 in FIG. 1. In at least some embodiments, the method is performed by a controller of an apparatus including sections for performing certain operations, such as the controller and apparatus shown in FIG. 10, which will be explained hereinafter. In at least some embodiments, the controller obtains a word language library and a training data set of writing samples.

At S540, an embedding section or a sub-section thereof selects the next writing sample of a plurality of writing samples, such as writing samples 410 in FIG. 4. In at least some embodiments, the plurality of writing samples form a training data set for training the word embedding learning function.

At S542, the embedding section or a sub-section thereof pre-processes the writing sample selected at S540. In at least some embodiments, the embedding section removes non-grammatic elements from the writing sample and normalizes the punctuation in the writing sample. In at least some embodiments, the controller performs operations similar to the operations at S322 and S324 in FIG. 3. In at least some embodiments, the embedding section discards writing samples that appear to be statistical outliers, such as writing samples of 500 characters or more. In at least some embodiments, each writing sample of the training data includes less than 500 characters.

At S543, the embedding section or a sub-section thereof tokenizes the words of the writing sample. In at least some embodiments, the embedding section matches words of the writing sample with words of the word language library to output a tokenized writing sample. In at least some embodiments, the embedding section matches different tenses or cases of a term with a unified case of the term, such as matching verbs of any tense to the infinitive, or matching adjectives and adverbs to a noun. In at least some embodiments, the embedding section removes any words that cannot be equated to a term in the word language library instead of or in addition to any such word removal during pre-processing at S542. In at least some embodiments, the embedding section removes any terms deemed to be too common, such as "a", "the", "and", etc. In at least some embodiments, the embedding section maintains certain common words that have are identified as having an impact on polarity classification, such as "good", "bad", "yes", "no", etc.

At S545, the embedding section applies the tokenized writing sample to the word embedding learning function. In at least some embodiments, the embedding section causes an applying section to perform the operation at S545. In at least some embodiments, the embedding section embeds each word of a plurality of words of a writing sample into a word vector based on surrounding words. In at least some embodiments, the word embedding learning function uses the skip-gram method, in which the word learning function outputs, for each word of the word language library, a probability that the word is a surrounding word, and thereby conceptually related. In at least some embodiments, the skip-gram method is used with a window size of 5, meaning that the surrounding 5 words on either side of a given word are considered for purposes of evaluating the output. In at least some embodiments, the skip-gram method is used with a vector dimension of 300.

At S546, the controller or a section thereof determines whether all of the writing samples have been processed. If the controller determines that there are remaining unprocessed writing samples, then the operational flow returns to next writing sample selection at S540 for another iteration of operations S540-S545. If the controller determines that all writing samples have been processed, then the operational flow proceeds to weight adjustment at S548.

At S548, a training section or a sub-section thereof adjusts the weights of the word embedding learning function. In at least some embodiments, the weights of the word embedding learning function are adjusted based on a loss function relating the output to a ground truth. In at least some embodiments, the training section uses a window size of 5, meaning that the surrounding 5 words on either side of a given word are considered conceptually related for purposes of establishing the ground truth. In at least some embodiments, the weights of the word embedding learning function are adjusted according to a learning function. As iterations of operations S540-S548 proceed, the training section trains the embedding learning function to relate each word of the writing samples of the training data set to surrounding words.

At S549, the controller or a section thereof, determines whether a termination condition for terminating the training process has been met. In at least some embodiments, the termination condition is a number of batches. In at least some embodiments, one batch includes all of the writing samples, and therefore one batch is complete once all of the writing samples have been processed once. In at least some embodiments, the termination condition is measured by convergence of the solution to the loss function. If the controller determines that the termination condition has not been met, then the operational flow returns to next writing sample selection at S540 for another batch. If the controller determines that the termination condition has been met, then the operational flow ends.

FIG. 6 is an operational flow for determining polarity indicative features, according to at least one embodiment of the present invention. The operational flow provides a method of determining polarity indicative features. In at least some embodiments, the method is performed by a controller of an apparatus including sections for performing certain operations, such as the controller and apparatus shown in FIG. 10, which will be explained hereinafter.

At S650, the controller or a section thereof obtains a training data set. In at least some embodiments, the controller obtains a training data set of writing samples, each writing sample having a polarity label. In at least some embodiments, the polarity label indicates positive, negative, or neutral for use in evaluating a loss function. In at least some embodiments, the training data set includes a plurality of writing samples having unstructured text, graphic expressions of emotion, such as emoticons or emoji, and references, such as HTTP addresses, hashtags, etc., such as messages posted to social media.

At S651, the controller or a section thereof compiles a list of potential features. In at least some embodiments, the controller scans the writing samples of the training data for non-grammatical elements, such as graphic representations of emotion, hashtags, and anything else that appears in a significant number of writing samples. In at least some embodiments, the controller tracks statistical data of the writing samples, such as word count, hashtag count, etc.

At S653, the controller or a section thereof compares a potential feature among the list of potential features compiled at S651 with the labels of the writing samples in which the potential feature appears. In at least some embodiments, for specific features, the controller compares the amount of positive writing samples in which the potential feature appears with the amount of negative writing samples in which the potential feature appears. In at least some embodiments, for statistical features, the controller compares writing samples of the training data set having corresponding polarity labels, to determine averages.

At S654, the controller or a section thereof determines whether or not the potential feature is indicative of polarity. In at least some embodiments, the controller determines that the feature is indicative of polarity if the frequency among positive writing samples in which the potential feature appears is significantly different than the frequency among negative writing samples in which the potential feature appears. In at least some embodiments, the controller determines that the feature is indicative of polarity if the average of the statistical feature among positive writing samples is significantly different from the average of the statistical feature among positive writing samples, provided the variance is not too large. If the potential feature is indicative of polarity, then the operational flow proceeds to threshold determination at S656. If the potential feature is not indicative of polarity, then the operational flow proceeds to S655, where the potential feature is discarded.

At S656, the controller or a section thereof determines a threshold to use for the feature determined to be indicative of polarity at S654. In at least some embodiments, each feature is encoded as a binary indication of whether or not the feature exists in the writing sample, and therefore statistical features are associated with a threshold value separating values indicating positive from values indicating negative, while specific features need no threshold. In at least some embodiments, as iterations of the operations at S653-S656 proceed, the controller determines the one or more features based on frequency of appearance among correspondingly labeled writing samples.

At S658, the controller or a section thereof determines whether all of the potential features in the list compiled at S650 have been processed. If the controller determines that there are remaining unprocessed potential features, then the operational flow returns to potential feature comparison at S653 for another iteration of operations S653-S656. If the controller determines that all potential features have been processed, then the operational flow ends.

FIG. 7 is a schematic diagram of a word learning function 702, according to at least one embodiment of the present invention. In at least some embodiments, word learning function 102 includes one or more neural networks arranged in layers that, when applied to an embedded writing sample 714, output a word-based polarity estimate 715. Word learning function 702 includes a Long Short-Term Memory (LSTM) layer 702A, a dropout layer 702B, an attention layer 702C, and a dense layer 702D.

LSTM layer 702A is trained to make a polarity predication for each word in the writing sample based on the word itself and, for every word after the first, the preceding prediction. In other words, LSTM layer 702A is trained to update the polarity prediction with each successive word in the writing sample until the last word.

Dropout layer 702B is configured to zero out, nullify, or otherwise "drop out" randomly selected bits of data from the feature vector output from the LSTM layer during training. In at least some embodiments, dropout layer 702B reduces overfitting of the resulting model. In at least some embodiments, dropout layer 702B is configured to deactivate once the model is trained, so that all bits of data from the feature vector output from the LSTM layer proceed to attention layer 702C.

Attention layer 702C is trained to emphasize words having a stronger association with a single possible polarity estimation output. In at least some embodiments, attention layer 702C is trained to increase the value of certain words that commonly appear in negative writing samples but rarely appear in positive writing samples, and also to increase the value of certain words that commonly appear in positive writing samples but rarely appear in negative writing samples.

Dense layer 702D is a fully connected, feed forward network layer. In at least some embodiments, dense layer 702D includes more than one fully connected feed forward network layer.

FIG. 8 is a schematic diagram of a feature learning function 803, according to at least one embodiment of the present invention. In at least some embodiments, feature learning function 803 includes one or more neural networks arranged in layers that, when applied to writing sample features 817, output a feature-based polarity estimate 818. Feature learning function 803 includes a first dropout layer 803A, a first dense layer 803B, a batch normalization layer 803C, a second dropout layer 803D, a second dense layer 803E.

Dropout layers 803A and 803D are configured to zero out, nullify, or otherwise "drop out" randomly selected bits of data from writing sample features 817 in the input layer and the feature vector output from batch normalization layer 803C during training. In at least some embodiments, dropout layers 803A and 803D reduce overfitting of the resulting model. In at least some embodiments, dropout layers 803A and 803D are configured to deactivate once the model is trained, so that all bits of data proceed through dropout layers 803A and 803D.

Dense layers 803B and 803E are fully connected, feed forward network layers. In at least some embodiments, dense layers 803B and 803E are trained to relate writing sample features 817 to feature-based polarity estimate 818. In other words, among the layers of feature learning function 803, dense layers 803B and 803E are primarily responsible for the task of estimating polarity based on writing sample features in at least some embodiments. In at least some embodiments, dense layers 803B and 803E include more than one fully connected feed forward network layer.

Batch normalization layer 803C is configured to coordinate the recalculation of weights during backpropagation with the actual distribution of input values during training. In at least some embodiments, batch normalization layer 803C reduces the number of batches required for the training process to converge on a solution to the loss function.

FIG. 9 is a schematic diagram of a polarity learning function 904, according to at least one embodiment of the present invention. In at least some embodiments, polarity learning function 904 is configured for input of a concatenation of a word-based polarity estimate 915 and a feature-based polarity estimate 918. In at least some embodiments, polarity learning function 904 includes one or more neural networks arranged in layers that, when applied to the concatenation of word-based polarity estimate 915 and feature-based polarity estimate 918, output an overall polarity estimate 919.

Polarity learning function 904 includes a dense layer 904A. Dense layer 904A is a fully connected, feed forward network layer. In at least some embodiments, dense layer 904A includes more than one fully connected feed forward network layer. In at least some embodiments, dense layer 904A is used with a sigmoid activation function as the output layer of polarity learning function 904, which is the output layer of a writing sample polarity classification model, such as writing sample polarity classification model 100 in FIG. 1. In at least some embodiments, polarity learning function 104 includes a hyper-parameter that assigns a relative weight to either or both of word-based polarity estimate 915 and feature-based polarity estimate 918.

In at least some embodiments, a writing sample polarity classification model applies a predetermined algorithm to output of a word learning function and a feature learning function, without using a further learning function. In at least some embodiments, instead of applying a polarity learning function, an applying section estimates a polarity of the writing sample based on output from the word learning function and output from the feature learning function. In at least some embodiments without a polarity learning function, a training section trains the word learning function and the feature learning function based on a loss function relating the estimated polarity to the word vector to produce a model for writing sample polarity classification.

Figure 10:
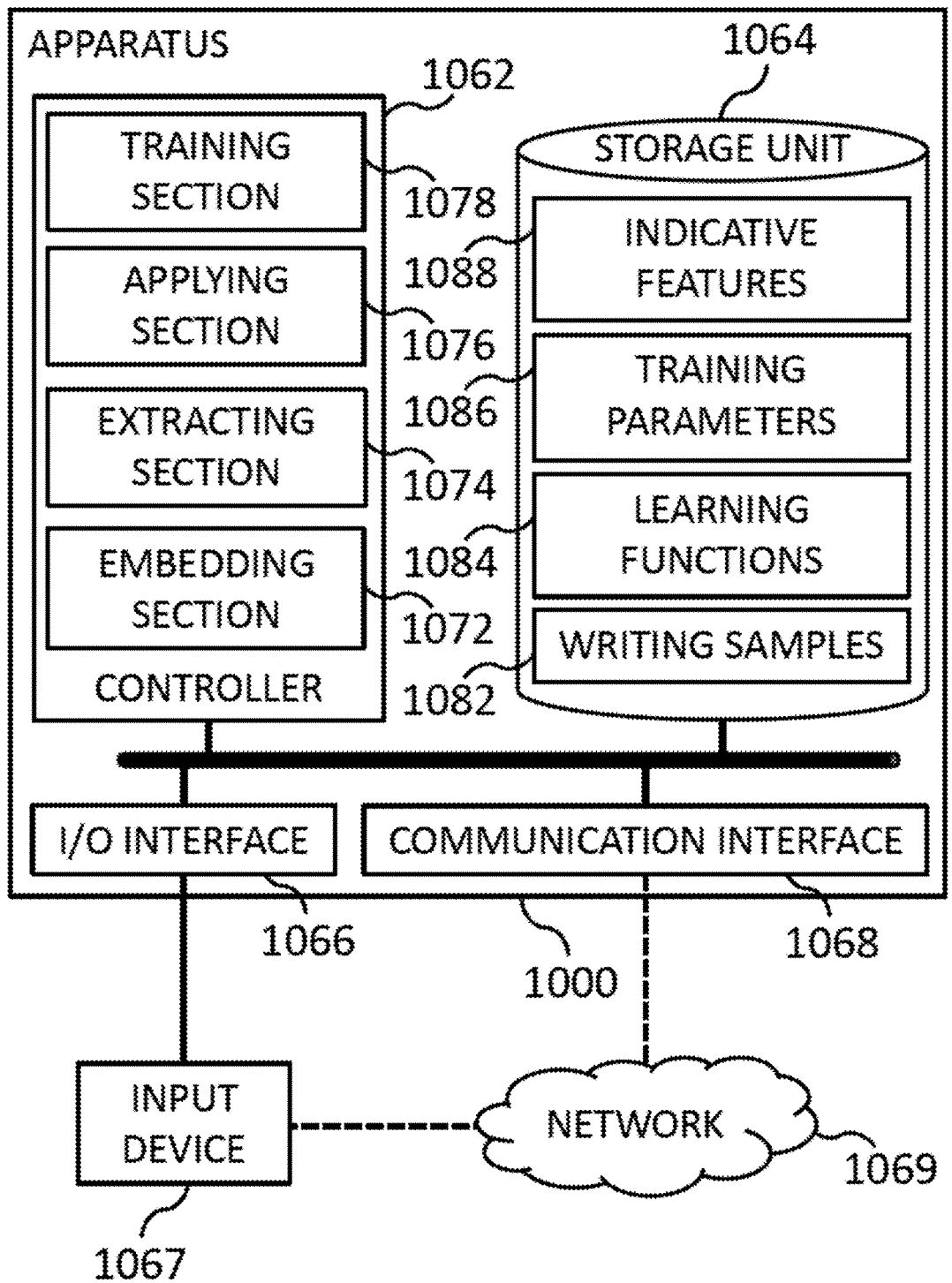
FIG. 10 is a block diagram of an exemplary hardware configuration for sentiment analysis, according to at least one embodiment of the present invention.

FIG. 10 is a block diagram of an exemplary hardware configuration for sentiment analysis, according to at least one embodiment of the present invention.

The exemplary hardware configuration includes apparatus 1000, which communicates with network 1069, and interacts with input device 1067. Apparatus 1000 may be a computer or other computing device that receives input or commands from input device 1067. Apparatus 1000 may be a host server that connects directly to input device 1067, or indirectly through network 1069. In some embodiments, apparatus 1000 is a computer system that includes two or more computers. In some embodiments, apparatus 1000 is a personal computer that executes an application for a user of apparatus 1000.

Apparatus 1000 includes a controller 1062, a storage unit 1064, a communication interface 1068, and an input/output interface 1066. In some embodiments, controller 1062 includes a processor or programmable circuitry executing instructions to cause the processor or programmable circuitry to perform operations according to the instructions. In some embodiments, controller 1062 includes analog or digital programmable circuitry, or any combination thereof. In some embodiments, controller 1062 includes physically separated storage or circuitry that interacts through communication. In some embodiments, storage unit 1064 includes a non-volatile computer-readable medium capable of storing executable and non-executable data for access by controller 1062 during execution of the instructions. Communication interface 1068 transmits and receives data from network 1069. Input/output interface 1066 connects to various input and output units via a parallel port, a serial port, a keyboard port, a mouse port, a monitor port, and the like to accept commands and present information.

Controller 1062 includes embedding section 1072, extracting section 1074, applying section 1076, and training section 1078. Storage unit 1064 includes writing samples 1082, learning functions 1084, training parameters 1086, and indicative features 1088.

Embedding section 1072 is the circuitry or instructions of controller 1062 configured to embed words of writing samples. In at least some embodiments, embedding section 1072 is configured to preprocess writing samples, tokenize the words of writing samples, and embed the tokenized words of the writing sample into a word vector based on surrounding words. In at least some embodiments, embedding section 1072 utilizes information in storage unit 1064, such as writing samples 1082, learning functions 1084, and training parameters 1086. In at least some embodiments, embedding section 1072 includes sub-sections for performing additional functions, as described in the foregoing flow charts. In at least some embodiments, such sub-sections may be referred to by a name associated with their function.

Extracting section 1074 is the circuitry or instructions of controller 1062 configured to extract features from writing samples. In at least some embodiments, extracting section 1074 is configured to extract a number of words in the writing sample, a number of references in the writing sample, one or more specific references in the writing sample, a number of graphic representations of positive emotion, a number of graphic representations of negative emotion, one or more specific graphic representations of emotion, etc., and combine the results into an encoded data string. In at least some embodiments, extracting section 1074 utilizes information in storage unit 1064, such as writing samples 1082 and indicative features 1088. In at least some embodiments, extracting section 1074 includes sub-sections for performing additional functions, as described in the foregoing flow charts. In at least some embodiments, such sub-sections may be referred to by a name associated with their function.

Applying section 1076 is the circuitry or instructions of controller 1062 configured to apply learning functions and models to input data to obtain output data. In at least some embodiments, applying section 1076 is configured to feed the input data to an input layer of the learning function or model, calculate intermediate values of intermediate layers, and read the output data from an output layer of the learning function or model. In at least some embodiments, applying section 1076 utilizes information in storage unit 1064, such as learning functions 1084. In at least some embodiments, applying section 1076 includes sub-sections for performing additional functions, as described in the foregoing flow charts. In at least some embodiments, such sub-sections may be referred to by a name associated with their function.

Training section 1078 is the circuitry or instructions of controller 1062 configured to train learning functions to produce models. In at least some embodiments, training section 1078 is configured to adjust weights of learning functions based on a loss function until the loss function converges on a solution or the training is otherwise deemed complete. In at least some embodiments, training section 1078 utilizes information in storage unit 1064, such as learning functions 1084 and training parameters 1086. In at least some embodiments, training section 1078 includes sub-sections for performing additional functions, as described in the foregoing flow charts. In at least some embodiments, such sub-sections are referred to by a name associated with the corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, polarity classifications of writing samples are obtained by sentiment analysis operations including embedding each word of a writing sample into a word vector based on surrounding words, extracting one or more features of the writing sample, applying a feature learning function to the one or more features, estimating a polarity of the writing sample based on output from the word learning function and output from the feature learning function, and training the word learning function and the feature learning function based on a loss function relating the estimated polarity to the word vector to produce a model for writing sample polarity classification.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a computer to cause the computer to perform operations comprising: embedding each word of a writing sample into a word vector based on surrounding words; extracting one or more non-grammatical features of the writing sample; applying a word learning function to the word vector; applying a feature learning function to the one or more non-grammatical features; estimating a polarity of the writing sample based on output from the word learning function and output from the feature learning function; training the word learning function and the feature learning function based on a loss function relating the estimated polarity to the word vector to produce a model for writing sample polarity classification.

2. The non-transitory computer-readable medium of claim 1, wherein the estimating includes applying a polarity learning function to a combination of output from the word learning function and the feature learning function to obtain the estimated polarity, and the training includes training the polarity learning function with the word learning function and the feature learning function based on the loss function relating the estimated polarity output from the polarity learning function to the word vector to produce the model for writing sample polarity classification.

3. The non-transitory computer-readable medium of claim 1, further comprising: obtaining a training data set of writing samples, each of the writing samples having a polarity label; comparing the writing samples of the training data set having corresponding polarity labels; and determining the one or more non-grammatical features based on frequency of appearance among the writing samples of the training data set having corresponding polarity labels.

4. The non-transitory computer-readable medium of claim 1, wherein the embedding includes removing non-grammatic elements from the writing sample; and tokenizing each word of the writing sample.

5. The non-transitory computer-readable medium of claim 4, wherein the tokenizing includes matching words of the writing sample with words of a word language library.

6. The non-transitory computer-readable medium of claim 1, further comprising: obtaining a word language library and a training data set of writing samples; training the embedding learning function to relate each word of the writing samples of the training data set to surrounding words.

7. The non-transitory computer-readable medium of claim 1, wherein each writing sample of the training data includes less than 500 characters.

8. The non-transitory computer-readable medium of claim 1, wherein the word learning function includes a Long Short-Term Memory (LSTM) layer and an attention layer.

9. The non-transitory computer-readable medium of claim 1, wherein the feature learning function includes a dropout layer, a dense layer, and a batch normalization layer.

10. The non-transitory computer-readable medium of claim 1, wherein the polarity learning function includes a dense layer.

11. The non-transitory computer-readable medium of claim 1, wherein the one or more non-grammatical features include a number of words, a number of references, a graphical representation of a positive emotion, and a graphical representation of a negative emotion.

12. A method comprising:
embedding each word of a writing sample into a word vector based on surrounding words;
extracting one or more non-grammatical features of the writing sample;
applying a word learning function to the word vector;
applying a feature learning function to the one or more non-grammatical features;
estimating a polarity of the writing sample based on output from the word learning function and output from the feature learning function;
training the word learning function and the feature learning function based on a loss function relating the estimated polarity to the word vector to produce a model for writing sample polarity classification.

13. The method of claim 12, wherein
the estimating includes applying a polarity learning function to a combination of output from the word learning function and the feature learning function to obtain the estimated polarity, and
the training includes training the polarity learning function with the word learning function and the feature learning function based on the loss function relating the estimated polarity output from the polarity learning function to the word vector to produce the model for writing sample polarity classification.

14. The method of claim 12, further comprising:
obtaining a training data set of writing samples, each writing sample having a polarity label;
comparing writing samples of the training data set having corresponding polarity labels; and
determining the one or more non-grammatical features based on frequency of appearance among correspondingly labeled writing samples.

15. The method of claim 12, wherein the embedding includes
removing non-grammatic elements from the writing sample; and
tokenizing each word of the writing sample.

16. The method of claim 15, wherein the tokenizing includes matching words of the writing sample with words of a word language library.

17. The method of claim 12, further comprising:
obtaining a word language library and a training data set of writing samples;
training the embedding learning function to relate each word of the writing samples of the training data set to surrounding words.

18. The method of claim 12, wherein each writing sample of the training data includes less than 500 characters.

19. The method of claim 12, wherein the word learning function includes a Long Short-Term Memory (LSTM) layer and an attention layer.

20. An apparatus comprising:
an embedding section configured to embed each word of a writing sample into a word vector based on surrounding words;
an extracting section configured to extract one or more non-grammatical features of the writing sample;
an applying section configured to
apply a word learning function to the word vector,
apply a feature learning function to the one or more non-grammatical features, and
estimate a polarity of the writing sample based on output from the word learning function and output from the feature learning function; and
a training section configured to estimate the word learning function and the feature learning function based on a loss function relating the estimated polarity to the word vector to produce a model for writing sample polarity classification.

* * * * *